April 7, 1970   J. T. MOORE ET AL   3,504,448
EDUCATIONAL DEVICE

Filed April 5, 1968                     2 Sheets-Sheet 1

INVENTORS:
JAMES T. MOORE
EARL P. MURPHY

BY Harrington A. Lackey
ATTORNEY

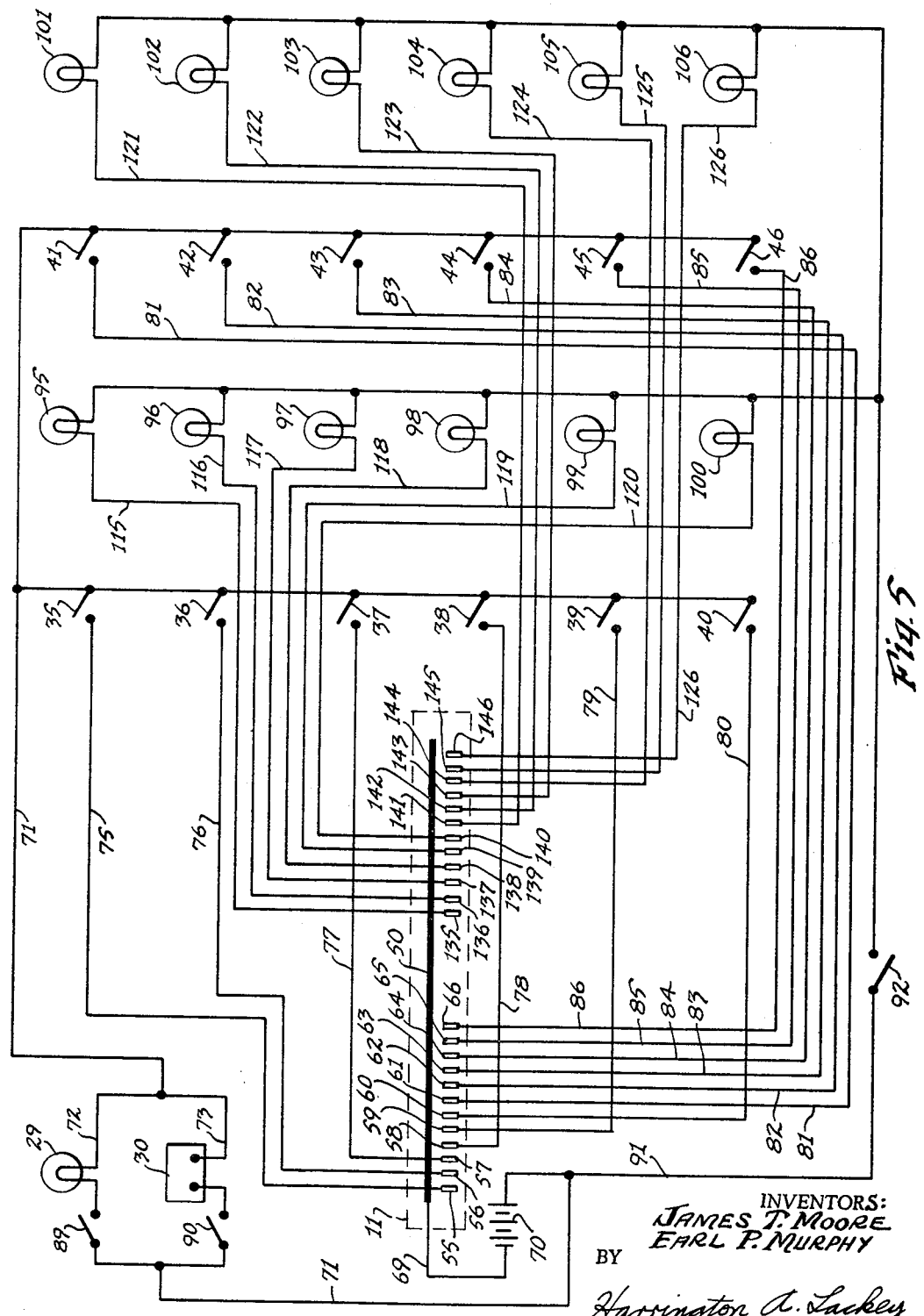

3,504,448
EDUCATIONAL DEVICE
James T. Moore, 1529 Shawnee Drive, and Earl P. Murphy, 621 E. 15th St., both of Bowling Green, Ky. 42101
Filed Apr. 5, 1968, Ser. No. 719,123
Int. Cl. G09b 7/06
U.S. Cl. 35—9    7 Claims

ABSTRACT OF THE DISCLOSURE

An educational board including a master receptacle for receiving a question card having an electrical bridge for engaging and closing one set of electrical contacts in a series of open contacts, a plurality of answer receptacles on the board for receiving different answer cards, an answer selector switch adjacent each answer receptacle, an electrical signal on the board and a source of electrical energy so connected that when the answer selector switch adjacent the receptacle receiving the corresponding correct answer card is closed, the electrical signal is energized.

BACKGROUND OF THE INVENTION

This invention relates to an educational device, and more particularly to an educational board for matching the correct answer to a question.

Although educational board devices are known, and many have been developed for the selection and indication of correct answers to questions, nevertheless many of these devices provide for the insertion of a correct answer card into a corresponding receptacle for bridging a circuit to signal the selection of the correct answer.

Furthermore, it is believed that previously existing answer selection boards are confined to the selection of the answer only, and not to the purpose of finding the answer should selection prove difficult.

SUMMARY OF THE INVENTION

This invention employs an educational board having receptacles for a single question card and a plurality of answer cards. The question card is provided with an appropriately positioned electrical bridge for closing an electrical circuit including an electrical power source and an audible or visual signal to condition a manually open switch adjacent one of the answer receptacles receiving the card displaying the correct answer to the question on the question card. Thus, when the answer selector switch adjacent the correct answer card is closed, the signal will be energized.

The invention further contemplates an answer-finder circuit including an illuminated answer-indicator signal adjacent each of the answer receptacles, an answer finder switch on the board, and another set of open indicator electrical contacts in the question receptacle adapted to be closed by a second finder bridge on the question card. Thus, should selection of the answer be difficult, or if the answer is desired to be found immediately for any reason, the answer finders switch is closed to immediately illuminate the signal or light adjacent the card bearing the correct answer.

The invention further contemplates a question card having a question bridge and an indicator bridge located thereon with one question displayed on one side of the card and another question displayed on the opposite side of the card. Thus, when the question card is turned end-for-end and received in the master receptacle the function of its bridges will be reversed, so that the question card can function for two questions, and thereby reduce the total number of question cards required by half.

BRIEF DESCRIPTION OF THE DRAWINGS

FIG. 5 is an electrical circuit diagram of the invention.

DESCRIPTION OF THE PREFERRED EMBODIMENT

Figure 1:
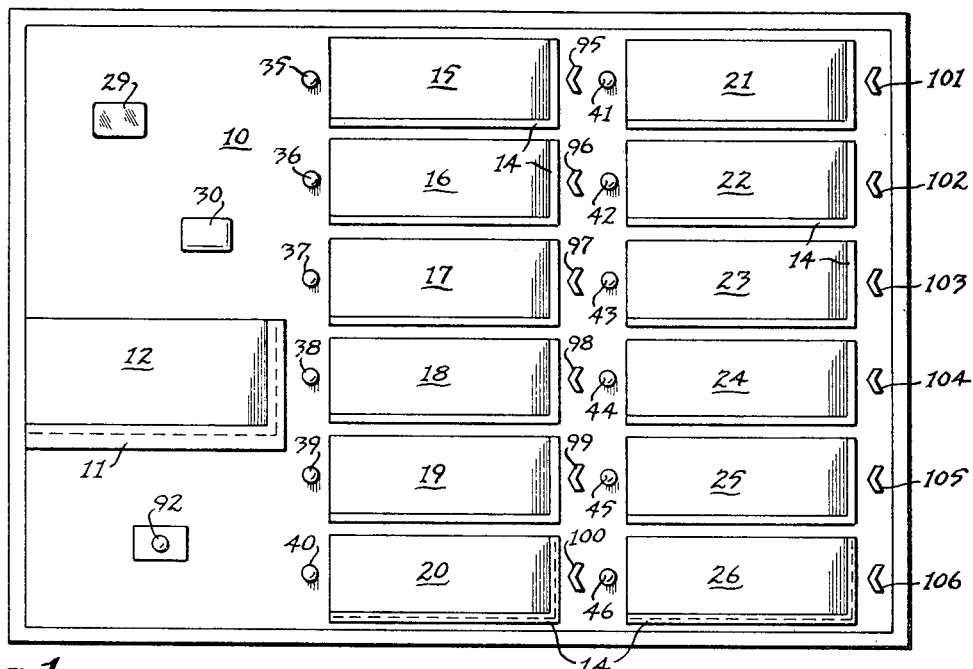
FIG. 1 is a plan view of the educational board made in accordance with this invention.

Referring now more particularly to the drawings, FIG. 1 discloses the educational device made in accordance with this invention incorporating a rectangular board 10 having thereon a single question receptacle 11 receiving a question card 12, and a plurality of answer receptacles 14, twelve being disclosed, each receiving a different answer card 15, 16, 17, 18, 19, 20, 21, 22, 23, 24, 25 and 26. Each answer card 15–26 is adapted to display, when received in its corresponding receptacle 14, an answer different from any of the other answer cards. Moreover, only one answer card, such as 15, discloses the correct answer to the question displayed by the question card 12.

Also mounted on the board 10 is an electrically illuminated selector signal, such as light 29, and optionally, an electrically energizable audible signal, such as buzzer 30.

Mounted on the board 10 adjacent each of the answer receptacles 14 and corresponding to each answer card 15–26 is a manually operated answer-selector switch 35, 36, 37, 38, 39, 40, 41, 42, 43, 44, 45 and 46, respectively. The master receptacle 11 may be of any appropriate construction for receiving the question card 12 to adequately display the question printed or otherwise formed on the face of the card 12. As disclosed in the drawings, the master receptacle 11 is L-shaped, including an elongated bottom wall 48 and a vertical end wall 49. Both walls 48 and 49 are channel-shaped to slidably receive the question card 12 flush against the board 10 above the receptacle 11 or from the end opposite the end wall 49. All of the answer receptacles 14 are disclosed of a similar construction to the master receptacle 11, although not necessarily limited to such construction so long as they receive the answer cards in position for displaying their respective answers.

Figure 3:
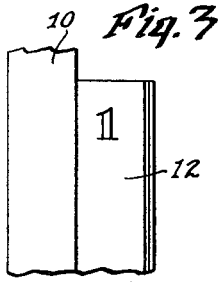
FIG. 3 is an enlarged section taken along the line 3—3 of FIG. 2.

However, the master receptacle 11 differs from the answer receptacles 14 in that the bottom wall 48 is provided with a plurality of longitudinally spaced sets of electrical selector or question switch contacts. Formed longitudinally in the bottom wall 48 is an elongated electrically conductive common bar 50. Also extending longitudinally of the bottom wall 48, parallel to and spaced slightly from the common bar 50, is a series of longitudinally spaced electrical selector or question switch contacts 55, 56, 57, 58, 59, 60, 61, 62, 63, 64, 65 and 66. Each contact 55–66 forms a set of open switch contacts with the common bar 50. Fixed to the bottom edge of the question card 12 is an electrically conductive question bridge, such as the button or bead 68, adapted to engage and close one set of switch contacts, such as 50 and 55 illustrated in FIGS. 2 and 3. Other question cards, such as 12, having different questions displayed thereon may have their electrical bridge 68 located at other longitudinal positions on the bottom edge thereof for engaging another set of contacts such as 50 and 56, 50 and 57, or 50 and 66.

Referring now to FIG. 5, the common bar 50 is connected through the common lead 69 to one side of an electrical source of energy, such as battery 70. The other side of battery 70 is connected to selector circuit 71. Selector circuit 71 is connected through parallel signal circuits 72 and 73, including the illuminated signal 29 and audible signal 30, respectively, to the manual answer selector switches 35–46. Each of the answer selector switches 35–46 is connected through respective parallel circuits 75, 76, 77, 78, 79, 80, 81, 82, 83, 84, 85 and 86 to the corresponding question contacts 55–66.

The visual or illuminated signal circuit 72 may include on the back of the board, a manual switch 89, and the audible signal circuit 73 may include a manual switch 90, so that either or both signals 29 and 30 may be incorporated in the selector circuit 71.

In operating the educational board 10 incorporating the selector circuit 71, a set of cards, including a question card 12 displaying a question on the face thereof and a plurality of answer cards, such as cards 15–26, only one of which displays a correct answer to the question, may be employed. Assuming that answer card 15 includes the correct answer to the question on question card 12, then answer card 15 will be inserted into the answer receptacle 14 opposite the answer selector switch, such as 35, which is conditioned by the closing of switch contact 55 and common bar 50 by the conductive question bridge 68 on the bottom of question card 12. Thus, if the operator of the board 10 closes any of the manual switches 36–46, no signal will be emitted from either of the electrical signals 29 or 30, since none of the answer selector circuits 76–86 are conditioned by closing their corresponding contacts 56–66. However, when the operator closes the manual switch 35, its circuit 75, conditioned by the closing of switch contact 55, will energize either or both of the electrical signals 29 and 30 to indicate that the answer displayed on card 15 is the correct one.

Figure 2:
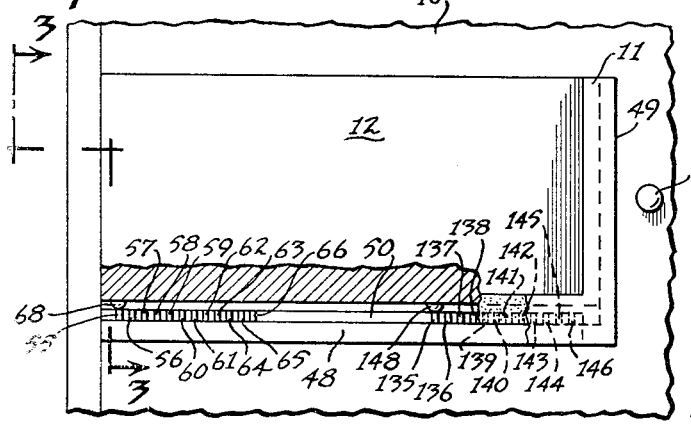
FIG. 2 is an enlarged fragmentary plan view of the question receptacle on the board disclosed in FIG. 1, with portions broken away to disclose a question card in operative position.

Other sets of question and answer cards may be employed in which the answer card 12 has a question bridge 68 located in a longitudinally different position from that disclosed in FIG. 2, but in such a position that it will engage one of the other eleven switch contacts 56–66. For example, if the question card 12 has a bridge 68 engaging switch contact 60 and common bar 50 when the question card 12 is received in the master receptacle 11, the selector circuit 80 will be conditioned to energize the signals 29 or 30 when the manual answer selector switch 40 is closed. Thus, the correct answer to the question on this question card 12 must appear on the answer card 20 in the answer receptacle 14 adjacent the selector switch 40.

It is also within the scope of this invention to provide a finder circuit 91 including an answer-finder switch 92 connected to the same side of the battery 70 as selector circuit 71. Included in the finder circuit 91 are a plurality of illuminated answer-indicator signals, such as the lamps 95, 96, 97, 98, 99, 100, 101, 102, 103, 104, 105 and 106, connected in parallel indicator circuits 115, 116, 117, 118, 119, 120, 121, 122, 123, 124, 125 and 126, respectively, to corresponding indicator contacts 135, 136, 137, 138, 139, 140, 141, 142, 143, 144, 145 and 146. The indicator contacts 135–146 are spaced in a straight line parallel to the conducting common bar 50, and also spaced longitudinally of the answer contacts 55–66 in the bottom wall 48 of the master receptacle 11. Adapted to electrically engage or bridge each of the indicator contacts 135–146 with the common bar 50 is an indicator bridge or conductive button 148, substantially identical to the bridge 68, except spaced longitudinally thereof for engagement with a corresponding indicator contact 135–146 simultaneously as the bridge 68 engages a question contact 55–66.

Each of the indicator lamps 95–106 is located in the board 10 adjacent a corresponding answer receptacle 14, so that when any of said lamps 95–106 is illuminated, it will indicate that its corresponding answer card 15–26 is displaying the correct answer.

As disclosed in FIG. 1, the answer-finder switch 92 is located on the face of the board 10 for convenient operation.

If for any reason, it is desired to immediately find and indicate the answer to the question displayed on the question card 12, then the answer-finder button-switch 92 is pressed to close the finder circuit 91. If the indicator bridge 148 on the particular question card 12 is engaging the first indicator contact 135, then closing of the answer-finder switch 92 will cause lamp 95 to illuminate, thus indicating that the correct answer is to be found upon the answer card 15 in the first answer receptacle 14.

As indicated in the drawings, and particularly in FIG. 2, both the question bridge 68 and the indicator bridge 148 engage their corresponding first contacts 55 and 135, and each of these closed contacts 55 and 135 conditions its respective circuit 75 and 115, both of which correspond to the first answer card 15. Thus, if either the answer selector switch 35 is pressed, or the answer-finder switch 92 is pressed, answer card 15 will be indicated either by the signal 29–30 or the indicator lamp 95, respectively, to indicate the answer on card 15 to be correct.

In a similar manner, each successive question contact 56–66 and each successive indicator contact 136–146 are adapted to condition, when closed, their successive circuits 76–86 and 116–126. Consequently, any question card 12 received in the master receptacle 11 will have its question bridge 68 and indicator bridge 148 spaced apart so that corresponding question contacts and indicator contacts will be simultaneously closed so that either the selector circuit 71 or finder circuit 91 may be employed to detect or indicate the same correct answer card 15–26. Thus, if the sixth question contact 60 is bridged by the conductive button 68, then the sixth indicator contact 140 will be bridged by the conductive indicator button 148, both of which will condition their corresponding circuits for the closing of the answer selector switch 40 or the illumination of the answer indicator lamp 100.

In order to reduce the number of sets of cards required for a given number of questions by one-half, one question can be placed on one face of question card 12 and another question may be placed on the opposite face of question card 12. In a similar manner, one set of answers may be placed on one face of the answer cards 15–26, while another set of answers corresponding to the question on the reverse face of the question card 12 may be placed on the reverse face of the same answer cards 15–26.

Figure 4:
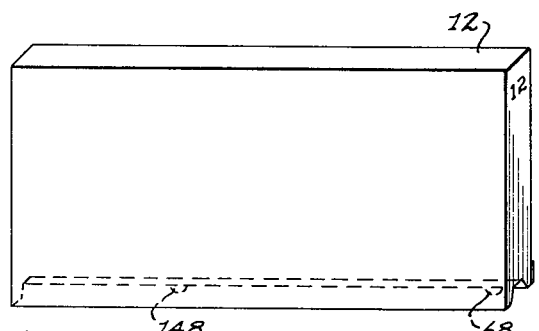
FIG. 4 is a perspective view of the question card disclosed in FIG. 2, turned end-for-end.

Furthermore, the spacing of the question contacts 55–66 and indicator contacts 135–146 and the bridges 68 and 148 may be so arranged that reversal of the question card 12 end-to-end, as disclosed in FIG. 4, will permit the indicator bridge 148 to function as a question bridge on a different set of selector contacts, while the question bridge 68 will function as an indicator bridge on a different set of indicator contacts, but corresponding to the question contacts simultaneously engaged by the bridge 148. An example of the operation of the reversible question cards 12 can be illustrated from FIGS. 2 and 4. FIG. 2 discloses question bridge 68 engaging the first question contact 55 and indicator bridge 148 engaging the first indicator contact 135. After the question card 12 has been removed and reversed end-to-end to a position indicated in FIG. 4, and re-inserted in master receptacle 11, the bridge 148 will then engage the twelfth question contact 66, while the bridge 68 will engage the twelfth indicator contact 146. Thus, where there are twelve contacts in each of the question and indicator sets, only six question cards 12 may be employed, instead of twelve.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. An educational device comprising:
   (a) a board,
   (b) a master receptacle on said board having a series of longitudinally spaced sets of question switch contacts,
   (c) a question card adapted to be received in said master receptacle and to display a question, said question card having an electrical bridge adapted to engage and close one of said sets of question contacts,
   (d) a plurality of answer receptacles on said board,
   (e) an answer card adapted to be received in each of said answer receptacles to display an answer,
   (f) a manual answer-selector switch adjacent each of said answer receptacles,
   (g) an electrical energy source,
   (h) an electrical signal to indicate the selection of a correct answer when energized,
   (i) each of said answer-selector switches being connected in series with a corresponding set of question switch contacts, said electrical energy source and said electrical signal, and each of said corresponding answer-selector switches and said sets of question contacts being connected in parallel, so that when said question card is received in said master receptacle and its bridge closes one set of question contacts and said corresponding answer selector switch is closed, said electrical signal is energized.

2. The invention according to claim 1 further comprising an answer-finder switch, an electrical answer-indicator illuminated signal on said board adjacent each of said answer receptacles, another series of longitudinally spaced sets of indicator switch contacts in said master receptacle spaced from said question contacts, said question card having a second bridge adapted to engage and close one of said sets of indicator contacts, each of said answer-indicator signals being connected in series with a corresponding set of indicator switch contacts, said electrical energy source and said answer-finder switch, so that when said answer-finder switch is closed, the answer-indicator signal corresponding to the bridged set of indicator contacts will be illuminated.

3. The invention according to claim 2 in which one electrical contact in each of said sets of question contacts and indicator contacts comprises an elongated electrically conducting common bar, and in which the other contacts of said set of question contacts and indicator contacts extend longitudinally parallel and adjacent to said common bar.

4. The invention according to claim 2 in which the spacing between said question contacts and said indicator contacts is such that when said question card is reversed end-for-end and received in said master receptacle, said question bridge closes a set of indicator contacts and said indicator bridge closes a set of question contacts.

5. The invention according to claim 2 in which said question bridge and said indicator bridge are longitudinally spaced on the bottom edge of said question card, said master receptacle having an elongated bottom wall for slidably receiving the bottom edge of said master card, said sets of question contacts and indicator contacts being formed on said bottom wall opposing said bridges for operative engagement.

6. The invention according to claim 1 in which said electrical signal comprises an electrically illuminated signal and an electrical audible signal connected in parallel signal circuits between said electrical energy source and said answer-selector switches, and a manual switch in each parallel signal circuit.

7. The invention according to claim 1 further comprising a plurality of said question cards, the question bridge on each card having a different longitudinal position on said card for engaging and closing a different set of question contacts when received in said master receptacle.

References Cited
UNITED STATES PATENTS

| | | | |
|---|---|---|---|
| 3,146,534 | 9/1964 | Brown et al. | 35—9 X |
| 3,327,405 | 6/1967 | Ingeneri | 35—9 |

EUGENE R. CAPOZIO, Primary Examiner

W. H. GRIEB, Assistant Examiner